(12) United States Patent
Murai

(10) Patent No.: US 6,530,976 B2
(45) Date of Patent: Mar. 11, 2003

(54) OZONE STORAGE METHOD AND OZONE STORAGE APPARATUS

(75) Inventor: Akira Murai, Nara (JP)

(73) Assignee: The Kansai Electric Power Co., Inc., Osaka (JP)

(*) Notice: Subject to any disclaimer, the term of this patent is extended or adjusted under 35 U.S.C. 154(b) by 0 days.

(21) Appl. No.: 09/795,306

(22) Filed: Mar. 1, 2001

(65) Prior Publication Data
US 2001/0022135 A1 Sep. 20, 2001

(30) Foreign Application Priority Data
Mar. 2, 2000 (JP) .......................... 2000-057456

(51) Int. Cl.⁷ .................... B01D 53/04; C01B 13/10
(52) U.S. Cl. ........................................ 95/138
(58) Field of Search ................ 95/138, 90, 114, 95/115, 900; 96/108, 121, 126, 131, 152, 139; 206/0.7; 205/626; 422/186.07, 186.11; 210/760; 423/581; 502/405; 261/DIG. 42

(56) References Cited

U.S. PATENT DOCUMENTS

| | | | |
|---|---|---|---|
| 4,604,279 A | | 8/1986 | Leitzke et al. |
| 4,786,489 A | | 11/1988 | Grenier et al. |
| 5,507,957 A | * | 4/1996 | Garrett et al. ............... 210/760 |
| 5,599,384 A | * | 2/1997 | Yoshida et al. ............... 96/143 |
| 5,730,783 A | * | 3/1998 | Sanui et al. .................. 95/138 |
| 5,785,738 A | | 7/1998 | Gastiger et al. |
| 5,846,298 A | * | 12/1998 | Weist, Jr. ..................... 95/138 |
| 5,853,457 A | * | 12/1998 | Eysmondt et al. ............ 95/138 |
| 5,888,271 A | | 3/1999 | Tanimura et al. |
| 6,214,199 B1 | * | 4/2001 | Izumi et al. ................. 205/626 |
| 6,254,763 B1 | * | 7/2001 | Izumi et al. ................. 205/626 |

FOREIGN PATENT DOCUMENTS

| | | | |
|---|---|---|---|
| EP | 0 792 836 A | | 9/1997 |
| EP | 0 893 400 A | | 1/1999 |
| EP | 0 893 403 A | | 1/1999 |
| JP | 353064690 A | * | 6/1978 |
| JP | 3-16638 A | | 1/1991 |
| JP | 9-235103 A | | 9/1997 |
| JP | 410196893 A | * | 7/1998 |
| JP | 10213293 A | * | 8/1998 |
| JP | 410287404 A | * | 10/1998 |
| JP | 11-33334 A | | 1/1999 |
| JP | 11-240703 A | | 9/1999 |
| JP | 11-292512 A | | 10/1999 |

* cited by examiner

Primary Examiner—David A. Simmons
Assistant Examiner—Frank M. Lawrence
(74) Attorney, Agent, or Firm—Smith Patent Office (57) ABSTRACT

An ozone storage apparatus is disclosed for storing ozone efficiently. A process for efficient water treatment is also disclosed. The ozone storage container has a generally U-shape and is filled with an absorbent. The ozone is supplied and discharged from the same opening. The temperature of the absorbent is kept between 0° C. and −30° C. The generated ozone from an ozone generating means is cooled by a cooling device and is supplied to a storage device.

1 Claim, 10 Drawing Sheets

OZONE STORAGE METHOD AND OZONE STORAGE APPARATUS

BACKGROUND OF THE INVENTION

1. Field of the Invention

The present invention relates to an ozone storage method and an ozone storage apparatus. Further, it relates to an ozone storage method and apparatus for storing ozone and extracting ozone by adsorption when it is demanded.

2. Discussion of the Related Art

In recent years, people have been very concerned about the environment. They are primarily concerned about water which has an intimate relation to their life.

Harmful chemicals such as some types of organic matter, ammonia, and so on, and other types of matter which may cause odors and colors are contained in secondary sewage treatment water, secondary night soil treatment water, industrial waste water, tap water, small water supply system water, exclusive tap water, water for industrial use, wastewater recycling system water, and effluents from fish farms and culture ponds. Further, organic matter such as environmental hormones are sometimes included and these elements are difficult to decompose through regular water treatments.

Accordingly, it is necessary to treat water thoroughly. Various water treatment methods have been investigated. Ozonolysis is a known decomposing method for decomposing organic matter such as environmental hormones.

Ozone is an oxidizer that is easy to use, and since it decomposes into oxygen, the concerns about secondary pollution are reduced. Therefore it is widely used for sterilizing, cleansing and oxidizing. However, ozone typically cannot be stored in cylinders or other containers since ozone, as a general rule, easily decomposes. Therefore, a silent discharge ozone generator, an ozone generator using an ultra-violet lamp or an electrolytic ozone generator is placed near the water treatment apparatus. The ozone generator is used to generate ozone that is directly used by the water treatment apparatus. However, with this method it is difficult to produce ozone to match a change in the required amount of ozone. Also, this method requires a great deal of electric power to generate the ozone.

The conventional ozone absorption/desorption operation will be explained below.

Japanese laid-open patent publication no. 11-292512 and other references disclose a conventional ozone storing technique. In this technique, ozone is absorbed for storage by an absorbent when the absorbent is cooled to a temperature not higher than −30° C. by a cooling means and the compressed ozone is supplied to the absorbent. When desorbing ozone from the absorbent, the absorbent then needs to be heated and decompressed.

This means that when the absorbent absorbs ozone, it is compressed up to 5 atm and when the ozone is discharged, it is decompressed up to 0.04 atm.

In the prior art ozone storage methods, the ozone needs to be compressed.

Therefore, this method is inefficient because a great deal of electric power is required for absorbing ozone in the silica gel by applying pressure. Also, compressed ozone becomes reactive and the durability of the storage container becomes a matter of concern.

Further, in order to compress ozone, the costs increase for large plants and additional workers. Also, this apparatus takes a large amount of space. For these reasons, there are many unsolved problems that remain for widespread use of an ozone storage apparatus.

Additionally, the absorbent is cooled when it absorbs ozone and it is heated when it desorbs ozone. Therefore, this method causes a drastic change in temperature for the absorbent and as a result the durability of the absorbent deteriorates.

SUMMARY OF THE INVENTION

As a result of continuing research into ozone storage apparatuses and methods, the inventor has found solutions for the above-mentioned issues.

The present invention includes a method for cooling the ozone to between 0° C. and −80° C. by a cooling means and then the ozone is supplied to a storage means which is filled with a silica gel.

The present invention also discloses cooling the ozone and then supplying the ozone to a storage means filled with a silica gel by applying a pressure of 1–2 atm while maintaining the temperature of the silica gel between 0° C. and −30° C.

The method of the invention can also cool the ozone and then supply the ozone to a silica gel that is cooled between 0° C. and −30° C. for storing the ozone and oxygen can be used as a purge gas for obtaining the stored ozone.

The oxygen used as the purge gas can be compressed and supplied at 1–2 atm.

The present invention also includes filling a container having two openings with an absorbent and introducing an ozone containing gas into the container through one of the openings so as to allow ozone to be absorbed.

The present invention also includes filling an ozone absorbent in the container having two openings and introducing an ozone containing gas from one opening so as to allow the ozone to be absorbed. When extracting ozone, oxygen is supplied from another opening and the ozone is extracted from the opening through which the ozone containing gas was introduced.

The apparatus can also include an ozone absorbent in a U-shaped container having openings in the upper part and ozone is introduced into one of openings so as to allow the ozone to be absorbed.

The apparatus can also store ozone in a plurality of U-shaped containers containing absorbent and these containers can be connected in at least one of a series connection and a parallel connection so as to introduce the ozone continuously into the plurality of U-shaped containers.

This invention discloses an efficient and easy handling ozone storage apparatus and method that generates ozone when electricity costs are low, such as during the night, and then the ozone is absorbed and stored. When ozone is to be subsequently used, the ozone can be desorbed by supplying an oxygen gas.

Also, in this ozone storage apparatus and method, the container for storing an absorbent of ozone has a compact structure and this improves the efficiency of absorption and desorption.

BRIEF DESCRIPTION OF THE DRAWINGS

The above objects and features of the present invention will be apparent to those skilled in the art from the following description of the preferred embodiments thereof when considered in conjunction with the appended drawings in which.

DETAILED DESCRIPTION OF THE PREFERRED EMBODIMENTS

Figure 1:
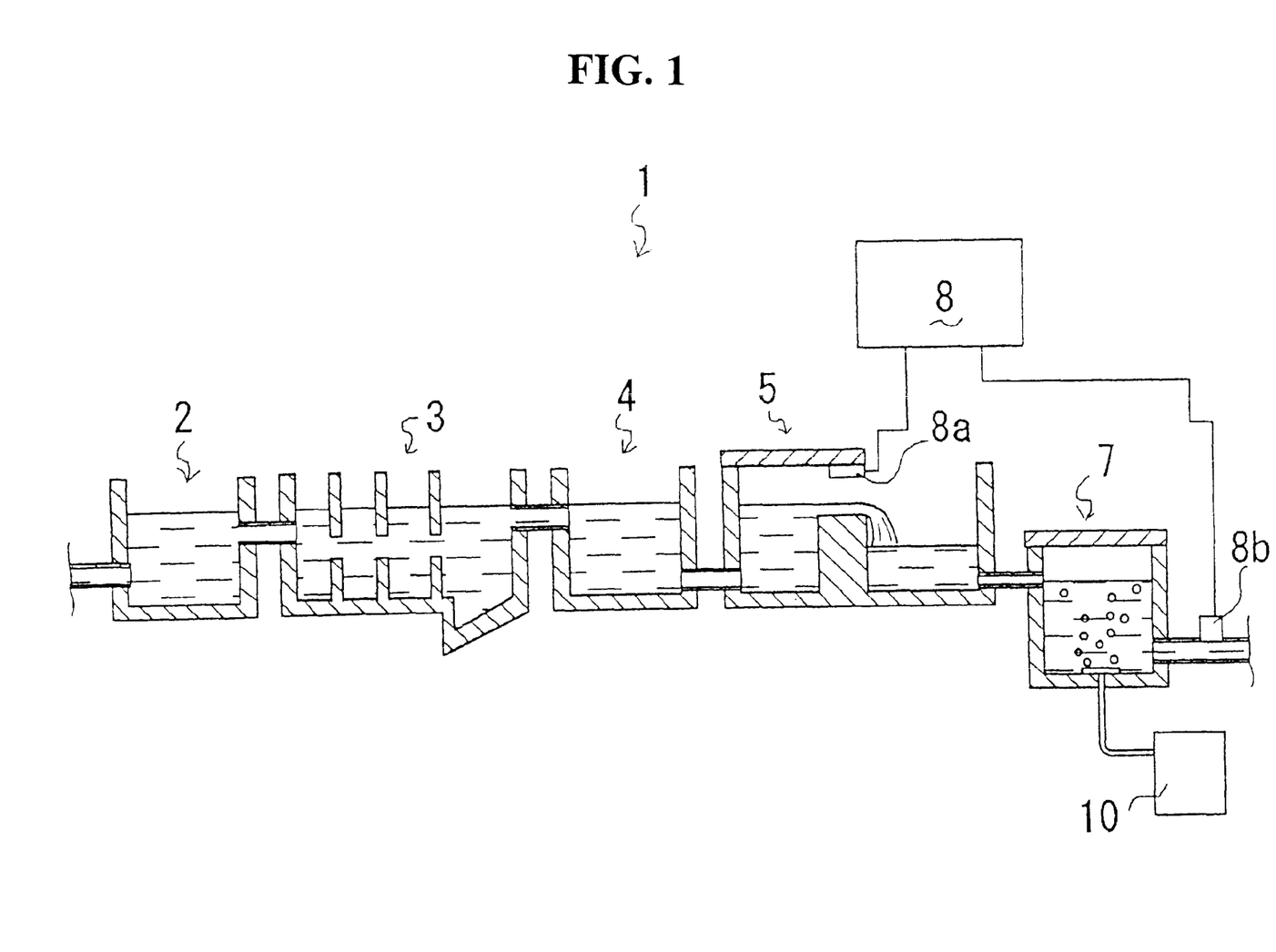
FIG. 1 is a flow diagram of a water treatment plant using ozone.
Figure 2:
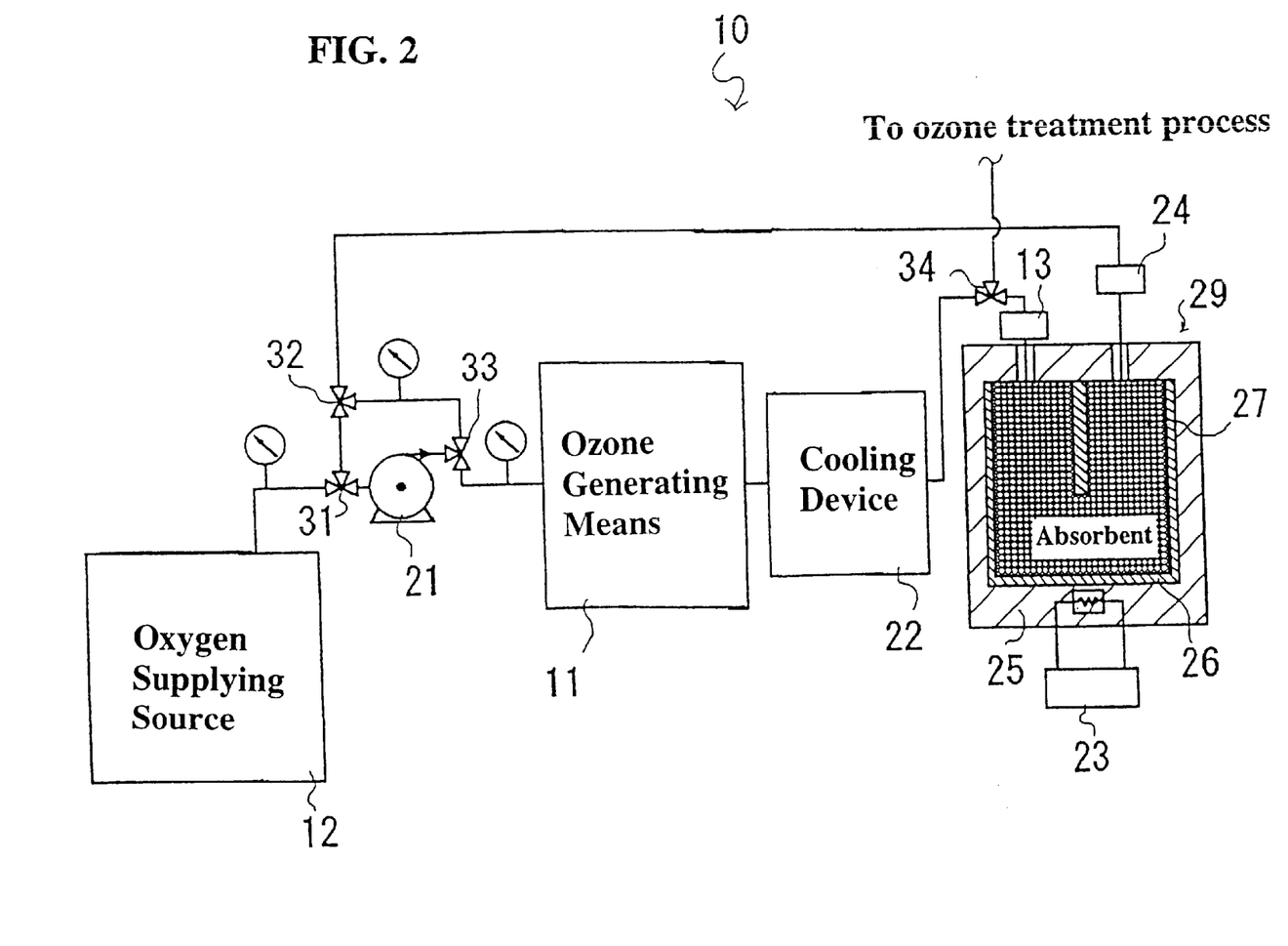
FIG. 2 is a schematic diagram showing the structure of the ozone storage apparatus.

Referring to FIGS. 1 and 2, the entire structure of a water treatment plant will be explained below.

In this embodiment, the water treatment plant 1 is for purifying water, for example, river water.

The water treatment plant 1 comprises a primary treatment process unit 2, a secondary treatment process unit 3, a tertiary treatment process unit 4, a flow measurement unit 5 and an ozone treatment process unit 7. These units are connected by pipes and raw water goes through each process in sequence.

The raw water introduced into the primary treatment process unit 2 receives an initial treatment so as to remove solid bodies, small suspended matter, decomposing oils and fats. Then the water is transferred to the secondary treatment process unit 3. In the secondary treatment process unit 3, various organic matter is decomposed and stabilized by microbes. In the tertiary treatment process unit 4, a coagulator and other chemicals are added. This causes coagulation and allows chemicals such as phophorus components to be removed.

After the treatment in the tertiary treatment process unit 4, the water is introduced into the flow measurement unit 5 where the quantity of the water is measured. It is possible to add a catalyst in an amount dependent on the quantity of the water to promote oxidation decomposition in the flow measurement unit 5.

After the catalyst is added, the water is introduced into an ozone treatment process unit 7 where ozone is injected so as to purify the water using an ozonization process.

As stated above, ozone treatment can include adding the proper amount of catalyst in the flow measurement unit 5 so that ozonization is completely performed and the efficiency of purification using ozone is improved.

In the above mentioned structures, a sensor 8a is placed on the flow measurement unit 5 and a sensor 8b is placed on the downstream side of the ozone treatment process unit 7. These sensors 8a and 8b are connected to a water examining device 8. The water examining device 8 examines the quantity of processing water and the quality of ozone treated water.

At the flow measurement unit 5, the flow rate of water being processed is recognized and it is output to the water examining equipment 8. Also at the ozone treatment process unit 7, ozone treated water is collected on the downstream side of the ozone treatment process unit 7 and it is introduced into the water examining equipment 8 so that the quality of ozone treated water can be examined.

The structure of an ozone storage apparatus is explained with reference to FIG. 2 and by initially referring to the entire structure of the ozone storage apparatus 10.

The ozone storage apparatus 10 is for storing ozone that is generated when the cost of electricity is low, for example, the late night discount rate. The apparatus is also for supplying ozone to the ozone treatment process unit 7 of the water processing plant 1 during daytime operation.

The ozone storage apparatus 10 comprises an oxygen supplying source 12, an ozone generating means 11, a cooling device 22 and a storage device 29. The ozone storage apparatus 10 performs the functions of storing the ozone and discharging the stored ozone.

To store ozone, ozone is generated by the ozone generating means 11 using oxygen supplied by the oxygen supplying source 12 and the generated ozone is cooled by the cooling device 22 and is subsequently stored in the storage device 29.

For discharging stored ozone from the storage device 29, oxygen is supplied from the oxygen supplying source 12 to the storage device 29.

Next, each part of the ozone storage apparatus 10 will be described.

In the ozone storage apparatus 10, the oxygen supplying source 12 is connected to a pump 21 through a two-way flow regulating valve 31. The oxygen supplying source 12 can use oxygen gas supplied from an oxygen cylinder or liquid oxygen.

The oxygen supplying source 12 is connected through the two-way flow regulating valve 31 to the pump 21. The ozone generating means 11 is connected through a two-way flow regulating valve 33 to the pump 21. Further, the pump 21 is connected to the storage device 29 through the two-way flow regulating valves 32 and 33.

The pump 21 should be placed between the two-way flow regulating valve 31 and the two-way flow regulating valve 33. Also the pump 21 introduces oxygen supplied through the two-way flow regulating valve 31 to the two-way flow regulating valve 33. As stated above, the pump 21 can be any type of structure that can cause a gas like oxygen to flow from the two-way flow regulating valve 31 to the two-way flow regulating valve 33. For example, the pump 2 could be a fan, a blower or a compressor as the situation demands.

The ozone generating means 11 is connected between the two-way flow regulating valve 33 and the cooling device 22. The ozone generating areas 11 is for generating ozone from oxygen supplied through the two-way flow regulating valve 33. In this embodiment, a silent discharge ozone generator can be used as the ozone generating means. When the ozone generating means 11 is not operated, oxygen supplied to the ozone generating means 11 is delivered to the cooling device 22 without being converted to ozone.

The cooling device 22 is placed between the ozone generating means 11 and the storage device 29. The cooling device 22 is for cooling the gas supplied from the ozone generating means 11. When ozone is generated, the gas from the ozone generating means 11 is heated, so the oxygen and the ozone which are supplied to the storage means 29 are cooled by the cooling device 22.

The reasons for cooling the gas with the cooling device 22 are so that the efficiency of ozone absorption in the storage device 29 is increased and fluctuations in temperature in the storage device 29 are reduced. Further, the storage device 29 can also be cooled since the cooled gas from the cooling device 22 passes though the storage device 29. This means that the storage device 29 can be cooled from the inside by cooled ozone.

The following device can be used as the cooling device 22. This device introduces oxygen and ozone into a heat exchanger supplied through the storage device 29 and it cools ozone by cooled oxygen in the storage device 29. In this case, the amount of electric power that is supplied from outside and that is consumed for cooling can be decreased.

Also, it is possible to operate a compressor or similar device to cool a coolant. Then both the coolant and the ozone can be introduced into the heat exchanger to cool the ozone. In this case, the burden imposed on cooling the storage device 29 can be lightened.

Further, a filter can be placed in the downstream side of the cooling device 22 to remove metallic steam and fine grains and as a result, the durability of a storage device 29 can be improved.

Ozone is cooled between 0° C. to −80° C. by the cooling device 22, then filtered to remove impurities, moisture and metallic elements, etc. and then it is supplied to the storage device 29 filled with a silica gel. Because the ozone is cooled between 0° C.−−80° C. the fine grains produced and accompanied by an electrical discharge can be filtered with moisture. Also, moisture can be supplied as a vapor at an upstream side of the cooling device 22 and thus the fine grains and moisture can be removed by cooling. By cooling, the moisture becomes small waterdrops having a core of fine grains that are contained in the ozone gas. Then, by removing the waterdrops, impurities in the ozone gas can be removed.

When ozone is supplied to an absorbent, the efficiency of ozone absorption is improved by cooling the ozone. Ozone generated by a silent discharge ozone generator shows an especially notable improvement in the efficiency of ozone absorption.

Therefore, by cooling the ozone to 0° C.−−80° C., the burden imposed on the storage device 29 can be reduced.

There are two cases that cool ozone up to around a room temperature and that cool ozone up to a storing temperature. If ozone is cooled to around room temperature, the cooling device 22 can have a simple structure. If ozone is cooled to a storing temperature, the burden imposed on the storage means 29 can be reduced and the fluctuations in temperature that effect the storage device 29 would be decreased.

The storage device 29 is connected to the cooling device 22 through a two-way flow regulating valve 34. The storage device 29 is also connected to the two-way flow regulating valve 32.

The storage device 29 comprises a storage container 26 containing an absorbent 27, a cooling retention device 25 including storage containers 26 and a cooling unit 23 connected to the cooling retention device 25.

The cooling retention device 25 holds at least one storage container 26 containing the absorbent 27 and keeps the storage container 26 cooled to a predetermined temperature. In this embodiment, the storage container 26 is cooled to between 0° C. to −30° C. The cooling retention device 25 can have insulation arranged around the part that contacts the storage containers 26 or a vacuum may be used in the space between the part that contacts the storage containers 26 and outer sides of cooling retention device 25 such as a dewar flask, etc. Further, the cooling unit 23 is connected to the cooling retention device 25 to maintain the storage container 26 at a predetermined temperature.

In the above mentioned the ozone storage apparatus 10, an ozone sensor 13 is located in the pipe that connects the cooling device 22 with the storage device 29. Also another ozone sensor 24 is located in the pipe that connects the two-way flow regulating valve 32 unit with the storage device 29. Since these sensors 13 and 24 detect the concentration of ozone flowing into the storage device 29, ozone can be efficiently stored in the storage device 29.

When storing the ozone, the concentration of ozone flowing into the storage device 29 is detected by the ozone sensor 13. Ozone is selectively absorbed by the absorbent 27 filled in the storage device 29. If ozone is sufficiently absorbed by the absorbent, the ozone sensor 24 detects an increase in the concentration of ozone. This indicates that the ozone has been sufficiently absorbed by the absorbent. When discharging ozone, the concentration of ozone is detected by the ozone sensor which is arranged on the discharging side.

The ozone storing process and the ozone discharging process will now be described reference to FIGS. 3A and 3B.

Figure 3A:
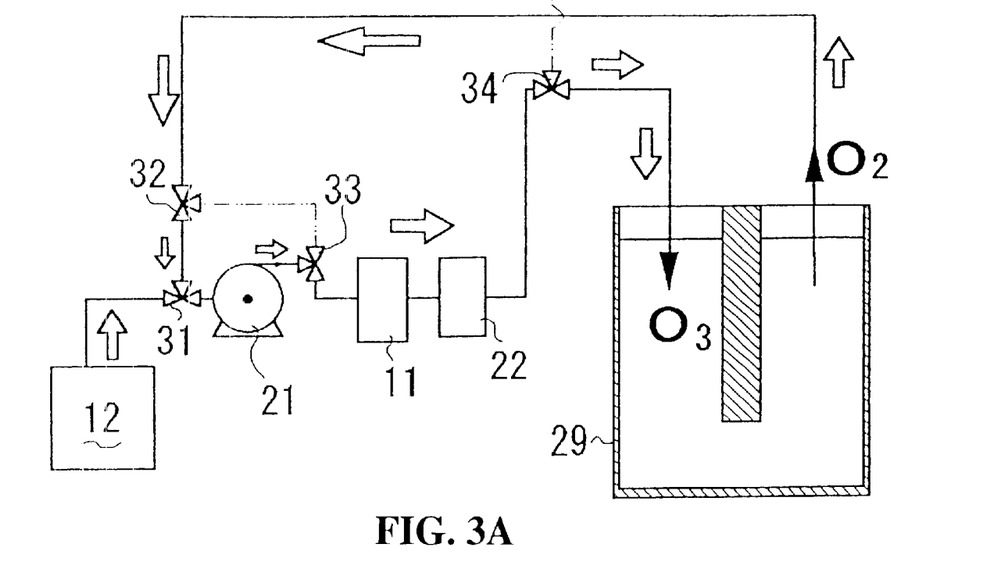
FIG. 3A is a schematic diagram showing the process of ozone absorption.
Figure 3B:
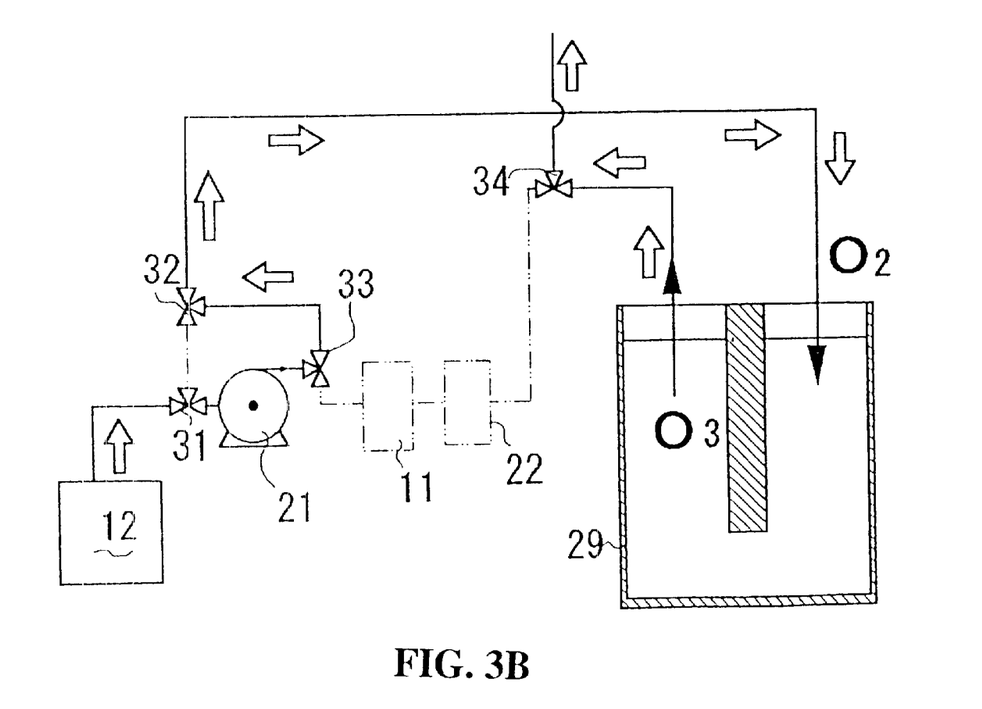
FIG. 3B is a schematic diagram showing the process of ozone desorption.

FIG. 3A shows the ozone storing process and FIG. 3B shows the ozone discharging process.

During the ozone storing process disclosed in FIG. 3A, the oxygen supplying source 12 is connected to the pump 21 though the two-way flow regulating valve 31 and oxygen is supplied to the ozone generating means 11 through the two-way flow regulating valve 31, the pump 21 and the two-way flow regulating valve 33. Oxygen supplied to the ozone generating means 11 is then converted into ozone.

Ozone and the unreacted oxygen are cooled by the cooling device 22 and they are supplied to the storage device 29 through the two-way flow regulating valve 34. In the storage device 29, ozone is selectively absorbed and oxygen is discharged from the storage means 29. Discharged oxygen from the storage device 29 passes though a pipe via the two-way flow regulating valve 32 and the two-way flow regulating valve 31 so that it can be supplied to the pump 21. Thus it is supplied again to the ozone generating means 11 along with oxygen that is supplied from the oxygen supplying source 12.

As a result, ozone is effectively and efficiently stored in the storage device 29. As stated above, the completion of ozone storage is detected by the ozone sensors 13 and 24 that are located in the pipes which are connected to the storage device 29.

The supplying pressure of ozone is 1–2 atm and the pressure is primarily caused by the pump 21 that supplies the oxygen. Also, the temperature of the cooled absorbent filled in the storage device 29 is maintained in a range of 0° C.−−30° C.

In the ozone discharging process disclosed in FIG. 3B, the oxygen supplying source 12 is connected to the pump 21 through the two-way flow regulating valve 31 and oxygen is supplied to the storage device 29 through the two-way flow regulating valves 33 and 32 using the pump 21. The stored ozone in the storage device 29 is discharged by supplying oxygen to the storage device 29.

The ozone discharged from the storage device 29 is supplied to the ozone treatment process 7 through the two-way flow regulating valve 34 and a pipe.

In order to desorb ozone which has been absorbed, oxygen is supplied so that the supplying pressure of oxygen is maintained in the range of 1–2 atm. The supplying pressure of oxygen is mainly caused by the pump which supplies the oxygen.

By supplying oxygen, the stored ozone in the absorbent at a temperature of 0° C.—30° C. is easily desorbed. Accordingly, the ozone can be extracted without heating or decompressing the storage device 29.

In this embodiment, a container including an ozone absorbent has two openings and the ozone containing gas flows through one of the openings so as to have ozone absorbed. When desorbing ozone, oxygen is supplied from another opening and the ozone is discharged from the opening through which the ozone containing gas flowed into the container.

Figure 4:
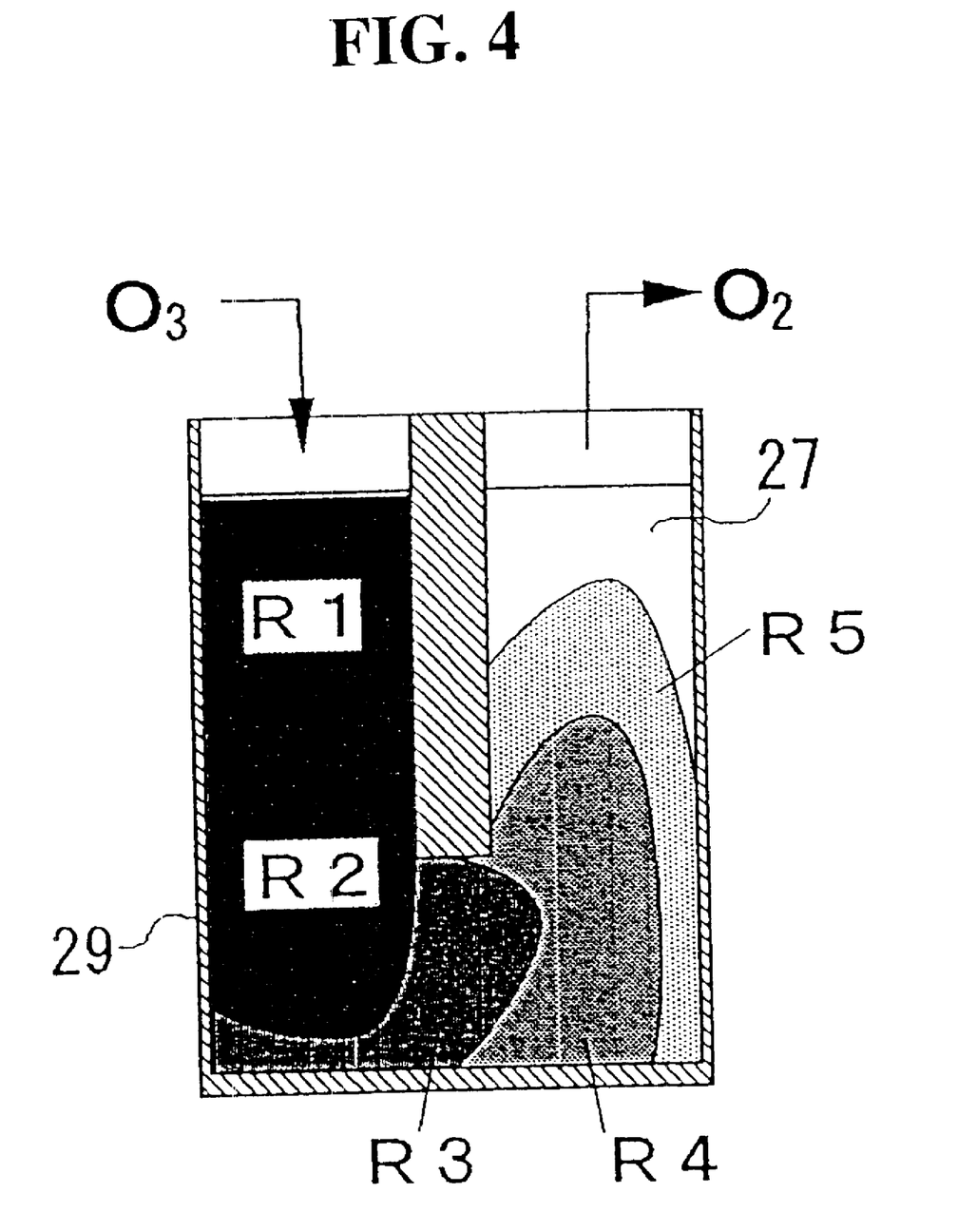
FIG. 4 is a view showing a distribution of the quantity of absorbed ozone in the storage means.

When storing ozone in the storage device 29, the absorbent nearest the opening where the ozone containing gas flows into the storage device 29 is exposed to highly concentrated ozone. Therefore, more ozone is absorbed in this region. Referring to FIG. 4, each region R1, R2, R3, R4 and R5 has a different concentration of absorbed ozone and the relationship of the concentrations is such that R1>R2>R3>R4>R5. This means that more ozone is absorbed around the opening into which ozone flows, and farther from the opening less ozone is absorbed.

Because of this situation, when the stored ozone is discharged from the opening where the ozone containing gas flows in a highly concentrated ozone can be supplied. If oxygen is supplied to the regions R5 and R4, having less absorbed ozone, the stored ozone is desorbed from the regions R5 and R4 and it flows into the regions R2 and R1. Since the ozone is sufficiently absorbed in the regions R2 and R1, the ozone desorbed from regions R5 and R4 will not be absorbed as it passes therethrough.

This means that the ozone can be discharged at a constant concentration, since the ozone is discharged from the opening in which the ozone containing gas flowed into the container.

Next, the structure of the storage container 26 containing the absorbent will be explained with reference to FIGS. 5 and 6.

A storage container having two openings is used to contain the absorbent. This type of container is useful when both oxygen and an ozone containing gas flow into one of the openings and oxygen flows out from the other so as to recycle the oxygen to make additional ozone.

However, if the storage container is shaped like a tube, the specific surface area becomes large, so not only does the storage container become larger but it then also has an inefficient structure for keeping the ozone cool. Further, when several storage containers are connected, the pipes become longer and the entire storage means becomes larger. For these reasons, the openings are arranged so that they are adjacent and the U-shaped storage container is used to make the specific surface area smaller.

Figure 5A:
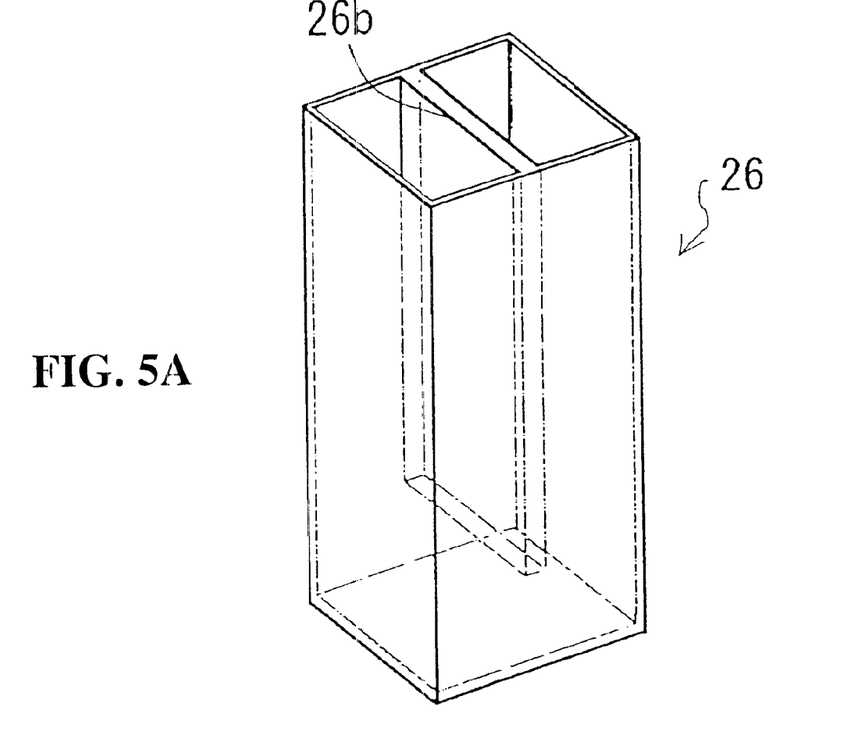
FIG. 5A is a perspective view showing the container of the absorbent.
Figure 5B:
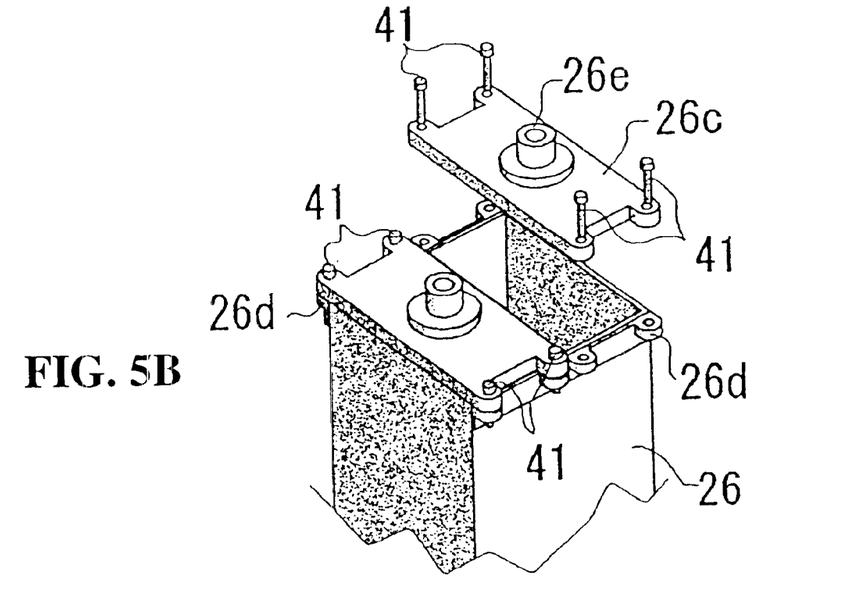
FIG. 5B is a perspective view showing the upper portion of the container.

FIG. 5A is a perspective view of the storage container 26. FIG. 5B is a perspective view of one type of storage container having a lid part.

As shown in a FIG. 5A, the storage container 26 having an opened top is shaped like a rectangular parallelepiped and has a partition board 26b which divides the inside of the storage container 26 into two sections. The partition board 26b has an upper end that is at the same height as the upper part of the storage container 26 and it extends vertically downward. The lower end of the partition board 26b does not reach the bottom of the storage container 26 and the lower end of the partition board 26b is spaced a certain distance from the bottom of the storage container 26.

The partition board 26b is placed so as to divide the area of top opening of the storage container 26 into two sections. The area bounded by the bottom end of the partition board 26b, the bottom of the storage container 26 and the sides of the storage container 26 to which the partition board 26b is connected, is arranged so as to be no bigger than half of the area of the upper portion of the storage container 26.

The inside of the storage container is formed so as to have a generally U-shape. By filling the ozone absorbent into the storage container 26, the absorbent assumes this U-shape. The storage container 26 has a rectangular parallelepiped or column shape with an open top and the partition board 26b is arranged so as to make the inside generally U-shaped.

At the top of the storage container 26, the lid bodies 26c are installed according to the shape of the open top. On the sides of the storage container 26, to which the partition board 26b is connected, stays 26d are fixed. The lid bodies 26c fit the open top of the storage container 26 and the stays 26d are fastened by screws 41. Accordingly, the lid bodies 26c cover the open top of the storage container 26. Furthermore, on the lid body 26c, a pipe connecting part 26e is provided for connecting a pipe through which ozone and oxygen can be introduced.

Figure 6:
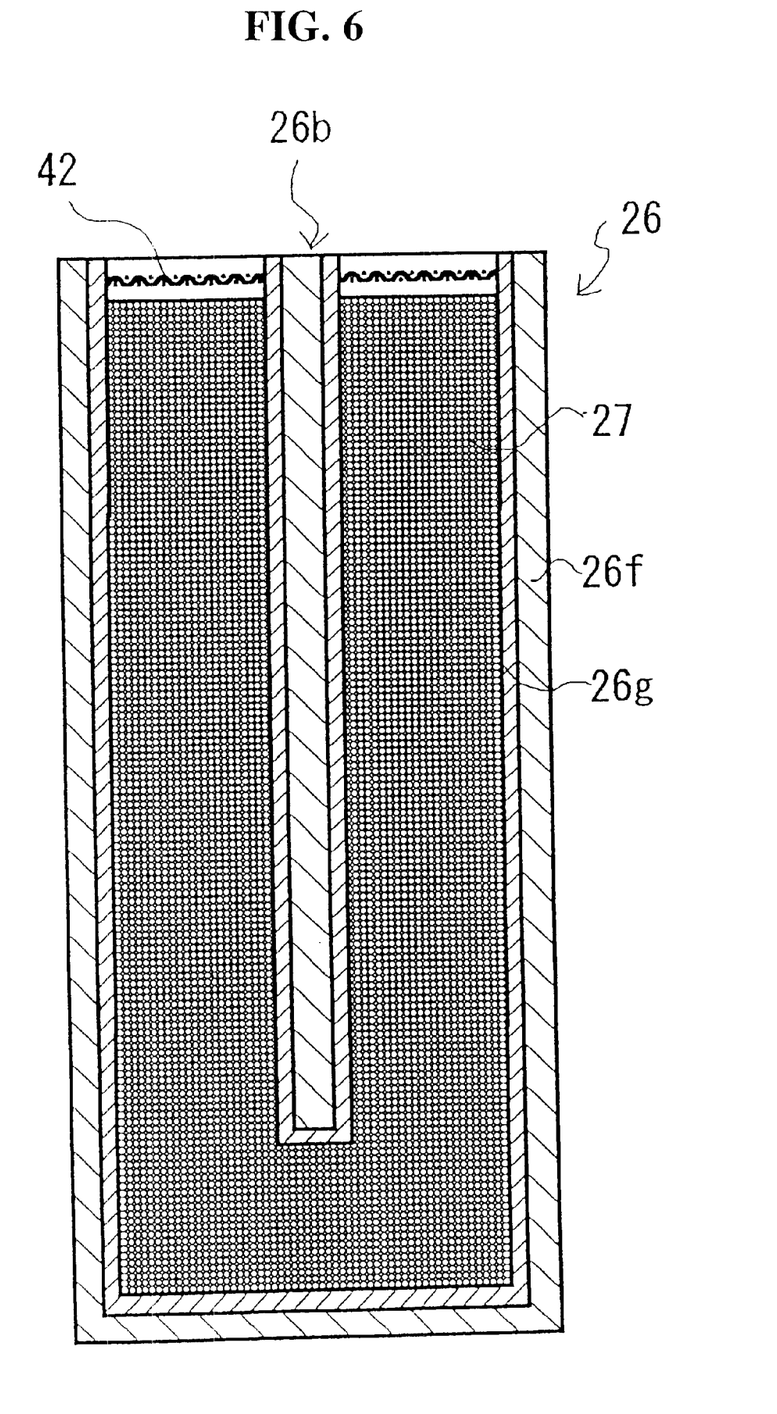
FIG. 6 is a cross sectional view showing the structure of the ozone storage container including the absorbent.

As shown in FIG. 6, the storage container 26 contains the absorbent 27 for storing ozone. At the upper part of the storage container 26, net bodies 42 are arranged across each part of the open top in order to prevent spillage of the absorbent 27. In this manner, the absorbent 27 in the storage container 26 can be controlled while preventing the outflow of the absorbent without hindering an inflow of ozone into the storage container 26.

In this embodiment, a silica gel is used as an absorbent. Depending on the situation, it is also possible to use a Cosilica Penta Zeolite, Faujasite, Deslumino Faujasite, Mesoporous Silicate, etc.

The storage container 26 has a two layer structure and an inner part 26g is made of an anti-corrosive material and an outer part 26f is made of a material having a high thermal conductivity.

In this embodiment, the outer part 26f of the storage container 26 is made of aluminum and the inner part 26g of storage container 26 is made of stainless steel. The partition board 26b has an inner layer made of aluminum and an outer layer adjacent to the absorbent that is made of stainless steel.

This means that the inner part of the storage container 26, which filled with the absorbent 27 and into which the ozone flows, is made of the anti-corrosive material and the other part which does not become exposed to ozone is made of an aluminum compound having a high thermal conductivity.

The storage container 26 has a structure such that the layer made of stainless steel is thinner than the layer made of aluminum. By making the layer made of stainless steel thin, this improves the thermal conductivity and improves the cooling efficiency of the storage container 26. However, the thickness of the layer 26g made of stainless steel should be thick enough to prevent the aluminum layer from contacting the ozone.

The storage container 26 is structured so as to have adjacent openings that are both arranged on the end of the container. Thus an ozone containing gas can flow into one of the openings of the storage container 26 so as to have ozone absorbed and oxygen can flow in from another opening to discharge ozone from the opening that the ozone containing gas originally flowed into.

The storage container 26 is structured so that the inside sectional area into which the ozone flows is almost constant.

In general, when gas flows into a pipe, it hardly generates any convection when the pipe has a small cross sectional area. On the other hand, it is easy to generate convection when the pipe has a large cross sectional area. Therefore, if ozone is introduced into a container having a large cross sectional area, the concentration of ozone will be uneven due to convection and so efficient absorption of ozone will be difficult to attain. However, if the cross sectional area is small, the ozone storage container will be long and narrow. Therefore this will cause the pipes to be located in an inconvenient location and the ratio of the surface area to the volume will increase so a great deal of additional energy will be needed to maintain the temperature.

Accordingly, in this embodiment, the storage container 26 has a U-shape and it is also structured to control convection of ozone or oxygen in the storage container 26 and to reduce the specific surface area.

Next, the structure of the cooling retention device 25 will be explained with reference to FIGS. 7 and 8.

The cooling retention device 25 comprises an outer case 25b and an inner case 25c. The outer case 25b and the inner case 25c are respectively formed as long rectangular boxes having open tops with the outer case 25b being one size larger than the inner case 25c.

They are connected when the inner case 25c is stored inside the outer case 25b. Inside the inner case 25c is a cooling room of the cooling retention device 25. The previously mentioned storage containers 26 are then stored inside the inner case 25c.

There is a space between the outer case 25b and the inner case 26c and the air in this space is evacuated to make the space between the outer case 25b and the inner case 26b so that it is held under vacuum. This improves the insulation efficiency of the cooling retention device 25.

Also, insulation like urethane foam or other compounds can be placed between the outer case 25b and inner case 25c to improve the insulation efficiency of the cooling retention device 25.

Around the periphery of the inner case 25c, a cooling pipe 25d is disposed and the cooling pipe 25d is fixed to the inner case 25c.

The cooling unit 23 is connected to the cooling retention device 25 and the above mentioned cooling pipe 25d is connected to the cooling unit 23. A compressor 23a and a heat radiator 23b are located in the cooling unit 23. A coolant circulates in the cooling pipe 25d and it has been compressed by the compressor 23a. The heat generated during the process is discharged through the heat radiator 23b to cool the coolant and the coolant then circulates through the cooling pipe 25d again.

The coolant that is cooled by the cooling unit 23 is introduced into the upper part of the inner case 25c and continues through the lower portion of the inner case 25c where it is then passed to the cooling unit 23.

The temperature of the cooling room of the cooling retention device 25 is set at the certain temperature level and it attempts to maintain this temperature. By operating the input operation part (which is not shown in Figures), the temperature of the cooling room can be set. A sensor for detecting the temperature of the cooling room is placed in the cooling room and the temperature of the cooling room can be detected. The operation of the cooling unit 23 is controlled based on the temperature information measured by the sensor.

Figure 7:
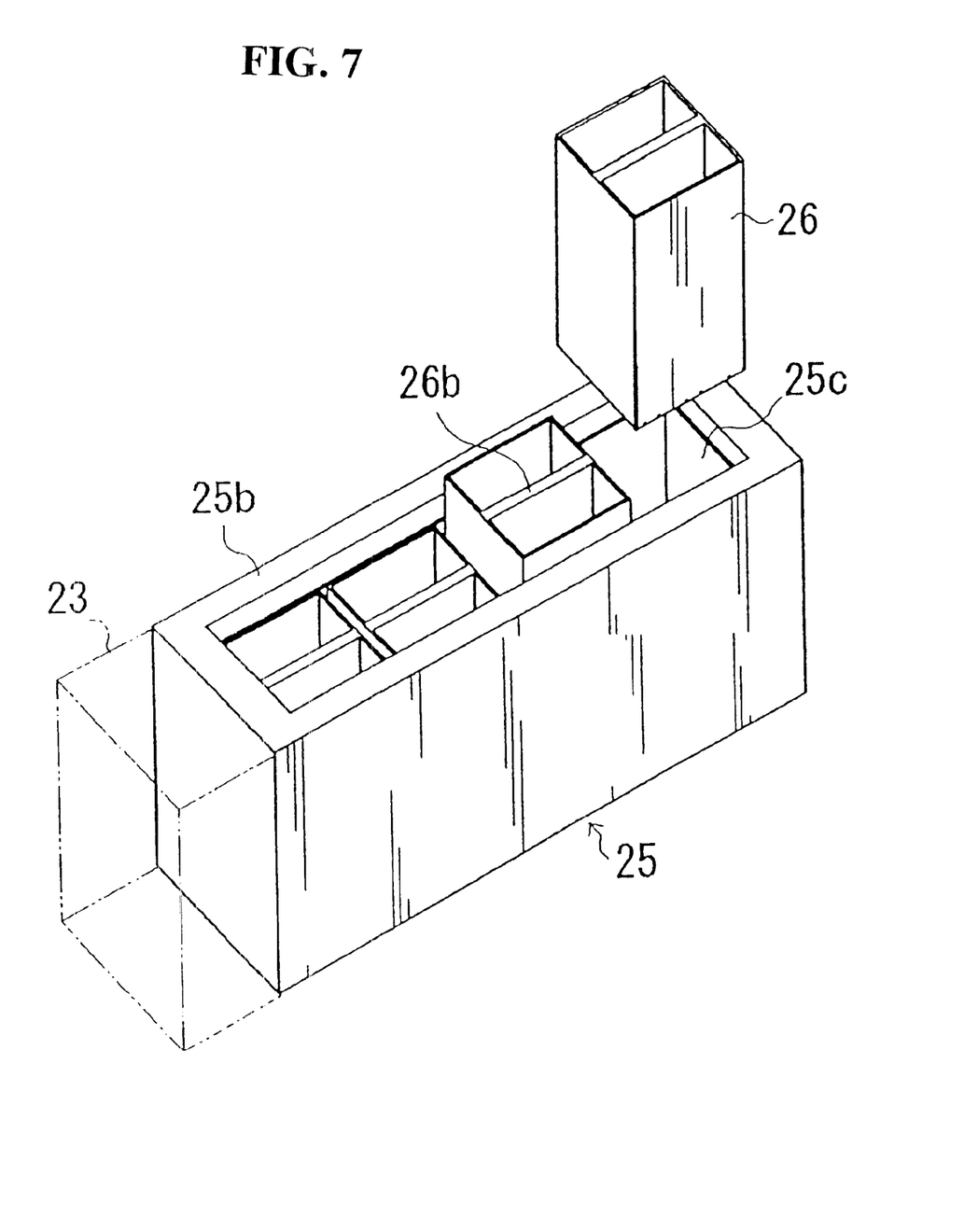
FIG. 7 is a perspective view showing the cooling device to cool the ozone storage containers.
Figure 8:
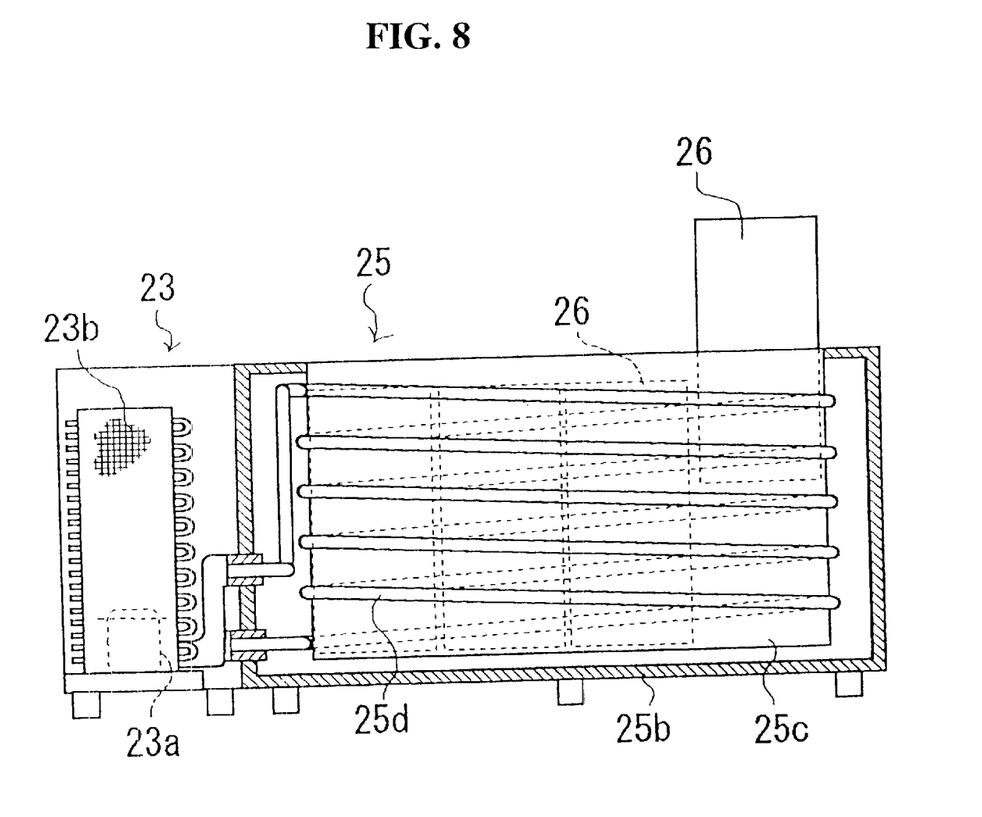
FIG. 8 is a cross sectional side elevational view showing the structure of the ozone storage container.

As shown in FIG. 7, a plurality of storage containers 26 are stored in the cooling retention device 25 and they are located so that their respective partition boards 26b make a straight line. The plurality of the storage containers 26 which are stored in the cooling retention device 25 are connected by pipes and continuously store ozone.

As mentioned above, since each storage container 26 has a U-shaped structure, the open tops of the storage containers 26 are adjacent to each other.

Figure 9:
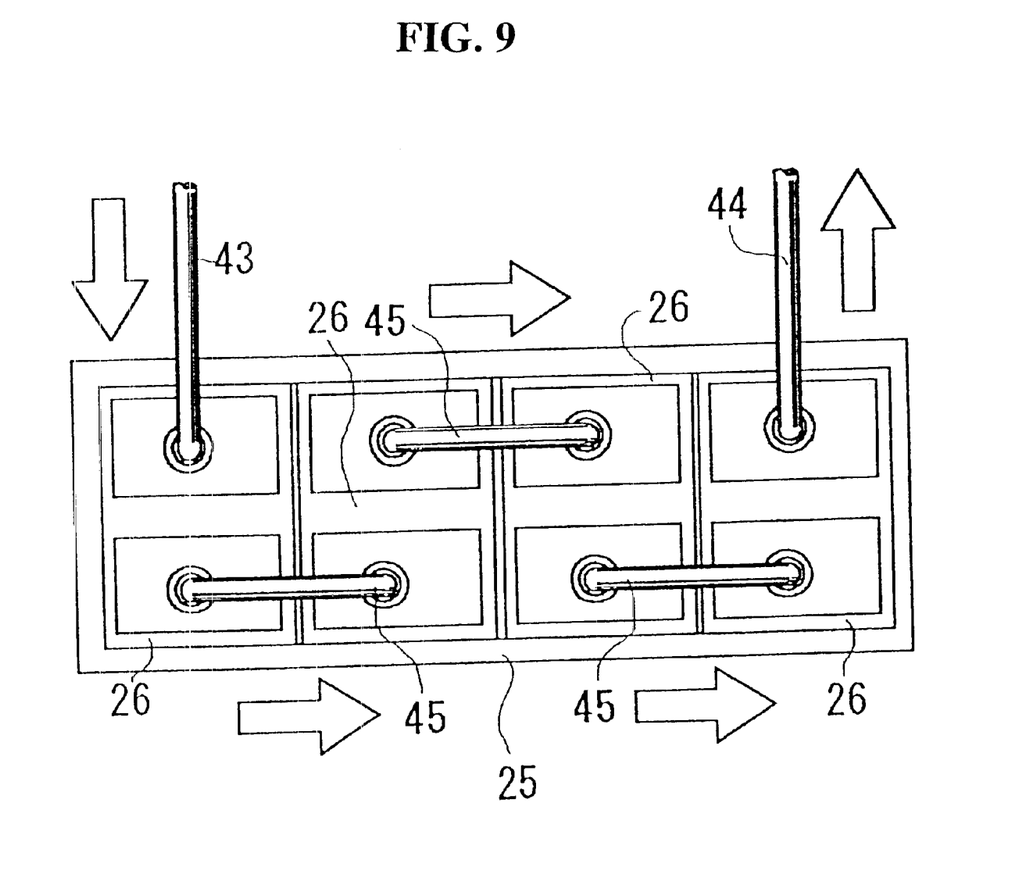
FIG. 9 is a plan view showing the ozone storage containers connected in series by pipes.

As shown in FIG. 9, when the storage containers 26 are connected by pipes 45, the lengths of the connecting pipes can be shortened. Since the total length of all of the pipes is shortened, the total quantity of heat that is absorbed by the pipes is reduced and the cooling efficiency is improved. Further, since the pipes connecting each of the storage containers 26 are located on the top portion, connecting these pipes can be easily performed.

Accordingly, as shown in FIG. 9, a gas can be introduced into the storage container 26 through a pipe 43 and the gas that overflows from one storage container 26 can be supplied to an adjacent storage container through the pipes 45. Therefore, it is possible to make the gas supplied from the pipe 43 go through a plurality of the storage containers 26 and flow out through a pipe 44. If the gas supplied to the storage container 26 is ozone, then by supplying ozone through the pipe 43, the ozone can be supplied to a plurality of the storage containers 26 in sequence.

Figure 10:
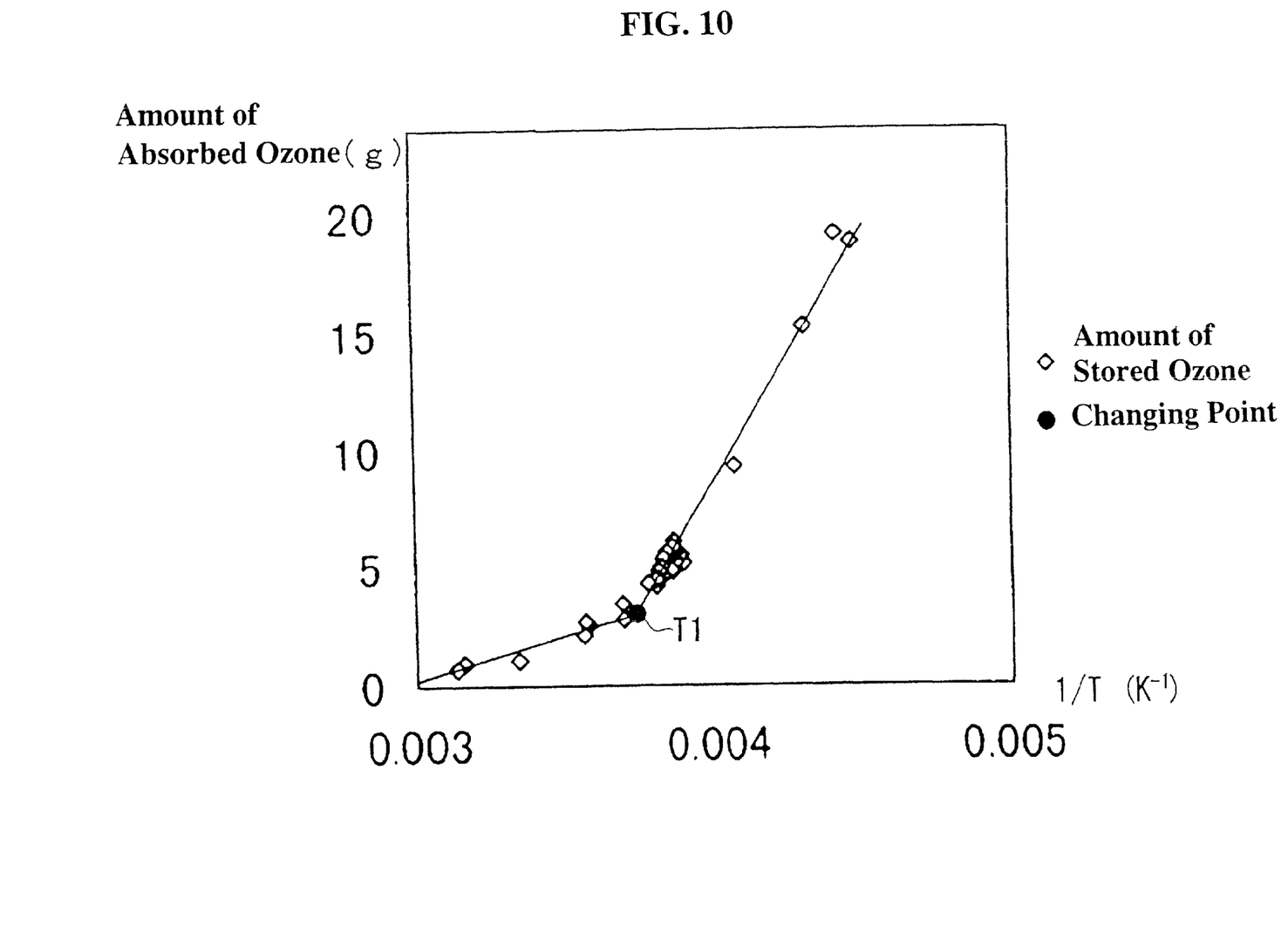
FIG. 10 is a graph illustrating the relationship between the quantity of stored ozone and the temperature.

Next, the temperature set up for the ozone absorbent will be explained.

In FIG. 10, the quantity of absorbed ozone in the absorbent changes at the changing point T1 which exists around $-5°$ C.

The amount of work needed to maintain the cooling retention device at a low temperature is important to consider.

This amount of work includes the energy for driving the compressor as well as the change in entropy to extract heat from the low heat source and transfer it to a high heat source. The energy for driving the compressor and so forth can be reduced by improving the driving efficiency. However, the change in entropy cannot be reduced.

To maintain the temperature of the cooling retention device 25, if the quantity of heat extracted from the cooling room at the room temperature and at the cooling retention device 25 are assumed to be same, the change in entropy is dependent on the temperature of the cooling room. Also the change in entropy is proportional to the inverse of the absolute temperature.

Accordingly, as the set up temperature of the cooling retention device 25 goes lower, the energy required for maintaining the temperature becomes larger. This situation is based on the second law of thermodynamics, and therefore it can not be changed by innovations in technique.

Hence, to store ozone efficiently, ozone should be kept cool so that it is around and below the above mentioned changing point T1.

Thus storing ozone at a temperature between $0°$ C. and $-30°$ C., and especially around $-5°$ C., allows the ozone to be stored efficiently.

Further, if ozone is stored at less than −30° C., a great deal of energy will be required for cooling. Also, when the electric supply is stopped due to a blackout or another reason, the temperature of the storage part increases rapidly. Moreover, a large amount of ozone is discharged. In such case, this results in high-pressure ozone being stored in the container. Since ozone is a powerful oxidizing agent, it is dangerous to discharge a large amount of ozone into the air.

Accordingly, by storing ozone at a temperature between 0° C. and −30° C., and especially around −5° C., ozone can be stored efficiently and safely.

This invention employs the above mentioned structure and by structuring the ozone storage apparatus in this manner, the ozone can be generated using an economical electricity rate, for example, a night discount rate and the ozone can then be extracted with a high rate of collection.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The present application is based on JP Patent Application No. 2000-057456, filed Mar. 2, 2000 which is incorporated herein by reference.

What is claimed is:

1. A method of storing ozone comprising the steps of:

cooling the ozone;

supplying the ozone to a storage means having a partition dividing an inside of the storage means into two sections, the two sections being filled with a silica gel, by applying a pressure of 1–2 atm while maintaining a temperature of the silica gel between 0° C. and −30° C.

* * * * *